(12) United States Patent
Zhang et al.

(10) Patent No.: US 11,734,076 B2
(45) Date of Patent: Aug. 22, 2023

(54) METHOD AND APPARATUS FOR TRAVERSING GRAPH DATABASE BASED ON ALLOCATION OF THREADS TO OPERATORS

(71) Applicant: BEIJING BAIDU NETCOM SCIENCE AND TECHNOLOGY CO., LTD., Beijing (CN)

(72) Inventors: Haiping Zhang, Beijing (CN); Yang Wang, Beijing (CN); Xi Chen, Beijing (CN); Yifei Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 279 days.

(21) Appl. No.: 17/076,400

(22) Filed: Oct. 21, 2020

(65) Prior Publication Data
US 2021/0216373 A1 Jul. 15, 2021

(30) Foreign Application Priority Data
Jan. 15, 2020 (CN) .......................... 202010043990.2

(51) Int. Cl.
*G06F 9/50* (2006.01)
*G06F 9/38* (2018.01)
(Continued)

(52) U.S. Cl.
CPC .......... *G06F 9/5038* (2013.01); *G06F 9/3009* (2013.01); *G06F 9/3851* (2013.01);
(Continued)

(58) Field of Classification Search
None
See application file for complete search history.

(56) References Cited

U.S. PATENT DOCUMENTS

2003/0182464 A1* 9/2003 Hamilton ................ G06F 9/546
709/213
2009/0013397 A1* 1/2009 May ........................ H04L 63/10
726/9
(Continued)

FOREIGN PATENT DOCUMENTS

JP 2008500627 A 1/2008
JP 2014194772 A 10/2014
(Continued)

OTHER PUBLICATIONS

Extended European Search Report for European Application No. 20202934.4. dated Apr. 13, 2021, 7 pages.
(Continued)

*Primary Examiner* — Abu Zar Ghaffari
(74) *Attorney, Agent, or Firm* — Lippes Mathias LLP

(57) ABSTRACT

A method includes obtaining a graph traversal statement; determining at least two operators contained in the graph traversal statement and an execution order, of the at least two operators, allocating a respective thread to each operator, creating a buffer queue for each two adjacent operators; for each two adjacent operators, executing an operation of a former operator by a thread, writing an executing result of the former operator to the buffer queue; an executing an operator of a latter operator by reading the execution result of the former operator by a thread from the buffer queue.

13 Claims, 4 Drawing Sheets obtaining a graph traversal statement, determining at least two operators contained in the graph traversal statement and an execution order of the operators, allocating a thread to each operator, and creating a buffer queue for each two adjacent operators — S301 for each two adjacent operators, executing an operation of a former operator by a thread corresponding to the former operator of the two adjacent operators, writing an execution result of the former operator to the buffer queue corresponding to the two adjacent operators; and executing an operation of a latter operator of the two adjacent operators in parallel by reading, from the buffer queue, the execution result of the former operator by a thread corresponding to the latter operator — S302 in response to determining that the thread corresponding to a target operator other than the first operator meets a condition of terminating to execute the operator, executing a preset operation to inform the thread corresponding to each operator before the target operator to terminate the operation of each operator — S303

(51) Int. Cl.
  *G06F 9/54* (2006.01)
  *G06F 16/2455* (2019.01)
  *G06F 16/903* (2019.01)
  *G06F 16/901* (2019.01)
  *G06F 9/30* (2018.01)
  *G06F 16/2453* (2019.01)
  *G06F 9/48* (2006.01)

(52) U.S. Cl.
  CPC ............ *G06F 9/4881* (2013.01); *G06F 9/544* (2013.01); *G06F 9/546* (2013.01); *G06F 16/24537* (2019.01); *G06F 16/24554* (2019.01); *G06F 16/903* (2019.01); *G06F 16/9024* (2019.01); *G06F 16/90335* (2019.01); *G06F 16/24561* (2019.01); *G06F 16/24565* (2019.01)

(56) References Cited

U.S. PATENT DOCUMENTS

| | | | | |
|---|---|---|---|---|
| 2011/0041132 | A1* | 2/2011 | Andrade | G06F 9/5083 718/102 |
| 2014/0095535 | A1* | 4/2014 | Deshmukh | G06F 16/24539 707/769 |
| 2014/0172914 | A1 | 6/2014 | Elnikety et al. | |
| 2015/0026438 | A1* | 1/2015 | Giroux | G06F 9/38 712/225 |
| 2015/0370919 | A1* | 12/2015 | Bornhoevd | G06F 16/9024 707/798 |
| 2016/0110228 | A1* | 4/2016 | Zhang | G06F 9/5083 718/104 |
| 2018/0357331 | A1* | 12/2018 | Wen | G06F 9/4881 |
| 2019/0187993 | A1* | 6/2019 | Ward | G06F 9/3857 |
| 2019/0384774 | A1* | 12/2019 | Chen | G06F 16/9024 |
| 2019/0384843 | A1* | 12/2019 | White | G06F 16/9024 |
| 2020/0265090 | A1* | 8/2020 | Hilloulin | G06F 16/9024 |
| 2020/0342027 | A1* | 10/2020 | Reehil | G06F 7/08 |
| 2020/0379773 | A1* | 12/2020 | Ni | G06F 9/5083 |
| 2021/0004374 | A1* | 1/2021 | Xia | G06F 16/9024 |
| 2021/0182285 | A1* | 6/2021 | Haprian | G06F 16/24561 |

FOREIGN PATENT DOCUMENTS

| | | |
|---|---|---|
| KR | 1020070031307 A | 3/2007 |
| WO | 2014052677 A2 | 4/2014 |
| WO | 2019241021 A1 | 12/2019 |

OTHER PUBLICATIONS

Office Action for Japanese Application No. 2021-005299, dated Jan. 11, 2022, 3 pages.

Goetz Graefe, "Encapsulation of Parallelism in the Vocano Query Processing System", ACM SIGMOD Record, vol. 19, Issue 2, Dec. 16, 1990, pp. 102-111.

Office Action for Korean Application No. 10-2021-0005000, dated Sep. 2, 2022, 7 pages.

* cited by examiner

METHOD AND APPARATUS FOR TRAVERSING GRAPH DATABASE BASED ON ALLOCATION OF THREADS TO OPERATORS

CROSS REFERENCE TO RELATED APPLICATIONS

This application claims priority and benefits to Chinese Application No. 202010043990.2, filed on Jan. 15, 2020, the entire content of which is incorporated herein by reference.

FIELD

The present disclosure relates to a field of computer technologies, and more particularly to a field of intelligent query technologies.

BACKGROUND

In a graph database, traversal operation is a most basic operation. In the related art, after a graph traversal statement inputted by a user is obtained, execution results of the previous operator are sequentially screened according to nested calls among a plurality of operators included in the graph traversal statement or an execution order of respective operators, to finally obtain a target element.

SUMMARY

A method for traversing a graph database is provided. The method includes: obtaining a graph traversal statement, determining at least two operators contained in the graph traversal statement and an execution order of the at least two operators, allocating a thread to each operator, and creating a buffer queue for each two adjacent operators; and for each two adjacent operators, executing an operation of a former operator by a thread corresponding to the former operator of the two adjacent operators, writing an execution result of the former operator to the buffer queue corresponding to the two adjacent operators; and reading, from the buffer queue, the execution result of the former operator of the two adjacent operators in parallel by a thread corresponding to a latter operator of the two adjacent operators, to execute an operation of the latter operator.

An electronic device is provided. The electronic device includes at least one processor and a memory. The memory is communicatively coupled to the at least one processor. The memory is configured to store instructions executed by the at least one processor. When the instructions are executed by the at least one processor, the at least one processor is caused to execute a method for traversing the graph database.

A non-transitory computer readable storage medium, having computer instructions stored thereon, is provided. The computer instructions are configured to cause a computer to execute a method for traversing the graph database.

Other effects achieved by the above alternative embodiments will be described below with reference to detailed embodiments.

BRIEF DESCRIPTION OF THE DRAWINGS

The accompanying drawings are used for better understanding the solution and do not constitute a limitation of the present disclosure.

DETAILED DESCRIPTION

Figure 1A:
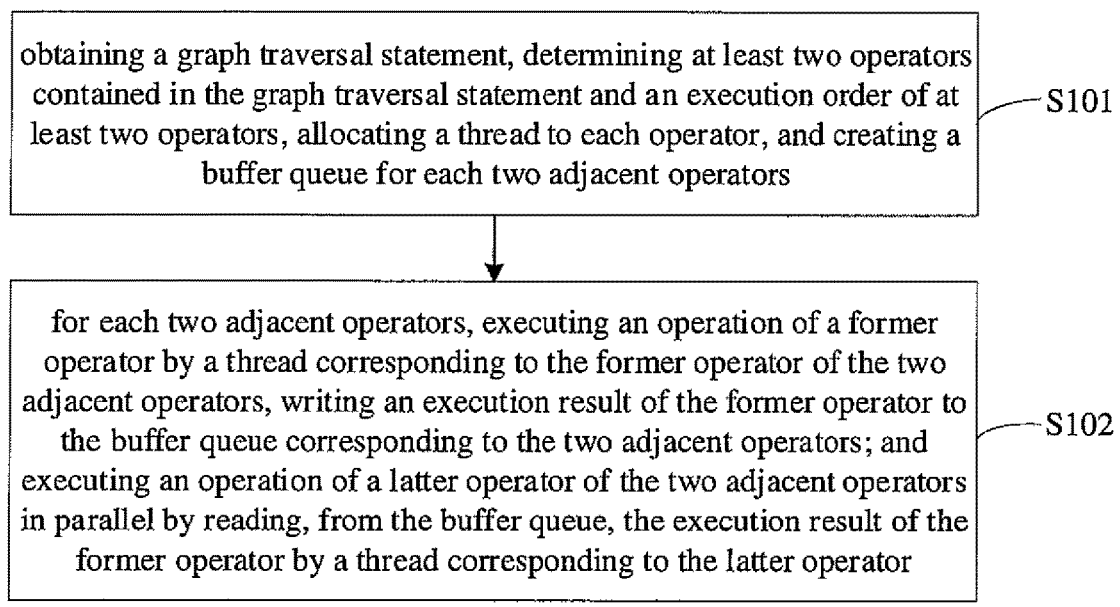
FIG. 1A is a flowchart illustrating a method for traversing a graph database according to an embodiment of the present disclosure.

Description will be made below to exemplary embodiments of the present disclosure with reference to accompanying drawings, which includes various details of embodiments of the present disclosure to facilitate understanding, and should be merely regarded as an example. Therefore, it should be recognized by the skilled in the art that various changes and modifications may be made to the embodiments described herein without departing from the scope and the spirit of the present disclosure. Meanwhile, for clarity and conciseness, descriptions for well-known functions and structures are omitted in the following description.

In a graph database, traversal operation is a most basic operation. In the related art, after a graph traversal statement inputted by a user is obtained, execution results of the previous operator are sequentially screened according to nested calls among a plurality of operators included in the graph traversal statement or an execution order of respective operators, to finally obtain a target element.

However, in a case of a large scale of data concurrency in the above two ways, a query efficiency of the target element is low, causing a low utilization rate of system resources.

Embodiments of the present disclosure provide a method and an apparatus for traversing a graph database, a device and a storage medium, to improve a query efficiency for a target element in the graph database and a utilization rate of system resources.

The method includes: obtaining a graph traversal statement, determining at least two operators contained in the graph traversal statement and an execution order of the at least two operators, allocating a thread to each operator, and creating a buffer queue for each two adjacent operators; and for each two adjacent operators, executing an operation of a former operator by a thread corresponding to the former operator of the two adjacent operators, writing an execution result of the former operator to the buffer queue corresponding to the two adjacent operators; and reading, from the buffer queue, the execution result of the former operator of the two adjacent operators in parallel by a thread corresponding to a latter operator of the two adjacent operators, to execute an operation of the latter operator.

With embodiments of the present disclosure, the buffer queue is created between each two adjacent operators, such that the execution result in the buffer queue may be read to execute the latter operator after the former operator of the two adjacent operators generates the execution result and writes the execution result into the buffer queue, thereby implementing to execute the operators in parallel, and improving the execution efficiency of the traversal operation and the utilization rate of the system resources.

In some embodiments, the method also includes: transmitting token data among threads corresponding to the at least two operators based on the execution order of the at least two operators, such that a thread receiving the token data starts to execute an operation of an operator corresponding to the thread and transmits the token data to the thread corresponding to a following operator.

With the implementation in the present disclosure, by transmitting the token data among the threads corresponding to the at least two operators, the start of the thread corresponding to the following operator is associated and triggered, thereby shortening a waiting time between the threads corresponding to adjacent operators and improving the execution efficiency.

In some embodiments, allocating the thread to each operator includes: according to the number of available threads, allocating the thread to each operator based on the execution order of the at least two operators.

With the implementation in the present disclosure, the thread is allocated to each operator based on the number of available threads and the execution order of the at least two operators, thereby improving an allocation mechanism of the threads, and providing guarantee for the parallel execution of the operators.

In some embodiments, in a case that the number of available threads is less than the number of operators, when transmitting the token data among the threads corresponding to the at least two operators based on the execution order of the at least two operators, the method also includes: determining, by the thread receiving the token data, whether a corresponding thread is allocated to the following operator; and when the thread receiving the token data determines that no corresponding thread is allocated to the following operator, and an allocated thread meets a preset condition, allocating the allocated thread to the following operator, and transmitting the token data to the allocated thread, such that the allocated thread executes the operation of the following operator. The preset condition is that the allocated thread completes the operation of the operator corresponding to the allocated thread.

With the implementations in the present disclosure, in the case that the number of available threads is less than the number of operators, the allocated thread that completes the operation of a corresponding operator is allocated to the following operator, which improves the thread allocation mechanism when the available threads are not much enough for all the operators, and provides guarantee for the parallel execution of the operators.

In some embodiments, allocating the thread to each operator and creating the buffer queue for each two adjacent operators include: allocating a thread of a local computer device to each operator, and creating a buffer queue for each two adjacent operators in the local computer device; or for each operator, determining a computer device for executing the operator from at least two computer devices, and allocating a thread of the determined computer device to the operator; and for each two adjacent operators, determining a computer device for creating the buffer queue from at least two computer devices, and creating the buffer queue corresponding to the two adjacent operators in the determined computer device.

With the implementation in the present disclosure, in the local computer device, the thread is allocated to each operator, and the buffer queue is created for each two adjacent operators; or, in the at least two computer devices, the thread is allocated to each operator and the buffer queue is created for each two adjacent operators, such that the traversal operation of the graph database may be implemented by a single computer device, and the traversal operation of the graph database may be implemented by a combination of a plurality of computer devices.

In some embodiments, the method also includes: for a first operator, sending address information of a buffer queue for saving the execution result of the first operator to a computer device for executing the first operator, such that the computer device for executing the first operator locates the buffer queue based on the address information; and for a target operator other than the first operator, sending address information of a first buffer queue for saving the execution result of a previous operator of the target operator and address information of a second buffer queue for saving the execution result of the target operator to a computer device for executing the target operator, such that the computer device for executing the target operator locates the first buffer queue and the second buffer queue based on the address information of the first buffer queue and the address information of the second buffer queue.

With the implementations in the present disclosure, the address information of the first buffer queue for saving the execution result of the previous operator and the address information of the second buffer queue for storing the execution result of the target operator are saved in the computer device for executing an operator operation, such that the thread for executing the operator operation may realize the accurate positioning for the buffer queue and provide guarantee for the traversal operation of the graph database.

In some embodiments, in a case that the buffer queue is created in a queue cluster, the address information of the buffer queue includes a queue identifier; and in a case that the buffer queue is created in the computer device, the address information of the buffer queue includes at least one of a device identifier of the computer device where the buffer queue is located, port information of the computer device where the buffer queue is located and the queue identifier.

With the implementations in the present disclosure, the address information corresponding to the buffer queues created in different positions is refined, which reflects a diversity of creation positions of the buffer queues and provides support for the traversal operation of the graph database.

In some embodiments, the method also includes: in response to determining that the thread corresponding to a target operator other than the first operator meets a condition of terminating to execute the operator, executing a preset operation to inform the thread corresponding to each operator before the target operator to terminate the operation of each operator.

With the implementations in the present disclosure, when the following operator determines that the condition of terminating to execute the operator is met, the preset operation is executed to inform all the previous operators to terminate the execution, thereby eliminating a large number of potentially invalid calculations by a feedback mechanism.

In some embodiments, executing the preset operation to inform the thread corresponding to each operator before the target operator to terminate the operation of each operator includes: taking the target operator as a current operator; switching a reading end state of the buffer queue for saving the execution result of a previous operator of the current operator to a closed state, such that the thread corresponding to the previous operator stops writing data to the buffer queue and switches a writing end state of the buffer queue to the closed state when detecting that the reading end state of the buffer queue is in the closed state, to terminate an execution of the previous operator; taking the previous operator as a new current operator, and executing the operation for switching the reading end state of the buffer queue for saving the execution result of a previous operator of the new current operator to the closed state until an execution of the first operator is terminated; or adding termination information to a preset global information table, such that the thread corresponding to each operator before the target operator terminates the operation of each operator when reading the termination information.

With the implementations in the present disclosure, by controlling the reading state and the writing state of the buffer queue, an association control of the threads corresponding to the operators associated with the buffer queue may be implemented, such that the threads corresponding to the operators may be terminated in turn by an association triggering of the buffer queue based on an order opposite to the execution order of the operators, thereby achieving an effect for avoiding the invalid calculation.

With the implementations in the present disclosure, the global information table added with the termination information is set in advance, such that the operation for executing the operator is terminated when the thread corresponding to each operator before the target operator reads the termination information, thereby achieving the effect for avoiding the invalid calculation.

FIG. 1A is a flowchart illustrating a method for traversing a graph database according to an embodiment of the present disclosure. Embodiments of the present disclosure are applicable to a condition where data traversal is performed in a graph database. The method is executed by an apparatus for traversing a graph database. The apparatus is implemented by software and/or hardware and is specifically configured in an electronic device with a data operation capability.

As illustrated in FIG. 1, the method for traversing the graph database includes following.

In block 101, a graph traversal statement is obtained, at least two operators contained in the graph traversal statement and an execution order of the at least two operators are determined, a thread is allocated for each operator, and a buffer queue is created for each two adjacent operators.

The graph traversal statement may be obtained by running written graph traversal statements. The graph traversal statement includes at least two operators. Operations of each operator include at least one of: migration, filtering, transformation, and querying in the graph database, thereby implementing corresponding functions.

The buffer queue is used to store an execution result of a former operator of the two adjacent operators, such that a latter operator of the two adjacent operators executes an operation corresponding to the latter operator based on the execution result of the former operator.

In an implementation of embodiments of the present disclosure, operations of allocating the thread and creating the buffer queue may be implemented by a single computer device. For example, threads of a local computer device are respectively allocated to the at least two operators, and the buffer queue is created for each two adjacent operators in the local computer device.

In another implementation of embodiments of the present disclosure, the operations for allocating the thread and creating the buffer queue may also be jointly implemented by multiple computer devices, to extend a solution for traversing the graph database to a distributed scene.

For example, for each operator, a computer device for executing the operator is determined from at least two computer devices, and the threads of the determined computer device are allocated to the operators. For each two adjacent operators, a computer device for creating the buffer queue is determined from at least two computer devices, and the buffer queue corresponding to the two adjacent operators is created in the determined computer device.

It should be noted that, the buffer queue for storing the execution result of the operator and the thread for executing a corresponding operator may be located in the same or different computer devices. Certainly, in order to shorten the time spent on data transmission and to improve the traversal efficiency of the graph database, the buffer queue for storing the execution result of the operator and the thread for executing the corresponding operator are located in the same computer device.

It may be understood that, during traversing the graph database, in order to avoid that an operating performance of the computer device is affected due to a large amount of stored data on the computer device caused by a large number of execution results of the operators, the buffer queue may also be created for each two adjacent operators in a queue cluster. For example, the queue cluster may adopt an open source distributed message subscription system (such as kafka).

For example, allocating the thread to each operator may include: allocating the threads to each operator based on the number of available threads and the execution order of the at least two operators. As another example, allocating the threads to each operator may include allocating the threads to each operator based on a preset relationship between threads and operators.

For example, the preset relationship between the threads and the operators may be set based on functions of the threads. A querying thread is used to execute an operator corresponding to a query operation, a transforming thread is used to execute an operator corresponding to a transformation operation, and a filtering thread is used to execute an operator corresponding to a filtering operation. As another example, the preset relationship between the threads and the operators may be set based on the total number of available threads and the total number of operators. For example, the total number of the available threads is 5 (corresponding serial numbers are 1-5) and the total number of operators is 3 (corresponding serial numbers are 1-3). The serial number of the operator is divided by the total number of the available threads to obtain the remainder to group the threads based on the remainder. For example, when the serial number of the operator is 1, the remainder obtained by dividing 1 by 3 is 1 such that the thread having the serial number of 1 is allocated to the operator. When the serial number of the operator is 2, the remainder obtained by dividing 2 by 3 is 2 such that the thread having the serial number of 2 is allocated to the operator. When the serial number of the operator is 3, the remainder obtained by dividing 3 by 3 is 3 such that the thread having the serial number of 3 is allocated to the operator.

It should be noted that, when the number of available threads is greater than or equal to the number of operators, each operator may be allocated with a different thread to perform operations of each operator. However, when the number of available threads is less than the number of operators, an operator may have no corresponding thread allocated thereto, limiting the number of concurrent threads. In this case, re-allocation of the thread may be implemented by reusing an allocated thread. For example, after all the threads are allocated, execution states of each allocated thread may be monitored. After one allocated thread completes the operation of the operator allocated to that allocated thread, this allocated thread may be re-allocated to the operator that does not have the thread corresponding thereto until all the operators are allocated with the threads.

In block 102, for each two adjacent operators, an operation of a former operator is executed by a thread corresponding to the former operator of the two adjacent operators and the execution result of the former operator is inputted to the buffer queue corresponding to the two adjacent operators. The execution result of the former operator of the two adjacent operators is read from the buffer queue in parallel by a thread corresponding to a latter operator of the two adjacent operators, to execute an operation of the latter operator.

Figure 1B:
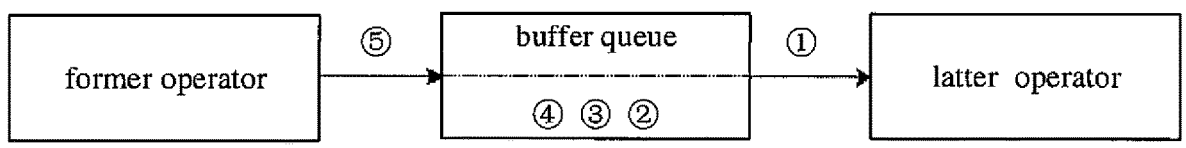
FIG. 1B is a schematic diagram illustrating a procedure for executing two adjacent operators according to an embodiment of the present disclosure.

As illustrated in FIG. 1B, a schematic diagram of executing two adjacent operators is shown. The thread corresponding to the former operator executes the former operator to obtain the execution results ①, ②, ③ and ④ and writes the execution results into the buffer queue in turn. The thread corresponding to the latter operator reads the execution results ① from the buffer queue as an input of the thread, and performs an operation of the latter operator corresponding to the thread based on the execution result ①. Meanwhile, the thread corresponding to the former operator executes in parallel the operation of the former operator corresponding to said thread to generate an execution result ⑤, and writes the execution result ⑤ into the buffer queue, such that the latter operator immediately starts its own thread to perform the operation of the latter operator upon obtaining an execution result, thereby saving the time for waiting data between adjacent operators.

In the related art, following two ways may be adopted to traverse the graph database.

Way (1): an operation of each layer is regarded as an operator, and each operator is regarded as an object which may be iterated. When the latter operator is executed, the former operator is iteratively called. All operators logically form a nested multi-layer iteration, and all layers are executed orderly and iteratively in a single round to generate a final result. For example, for a statement "g.V(1).out ("friend").has('age',eq(25)).properties('name')", a meaning of this statement is to query a name of a friend whose number is 1 and whose age is 25. The execution of the operator "properties" needs to call the operator "has" once to obtain a result. Calling the operator "has" leads to call the operator "out". The execution of the operator "out" leads to the execution of the operator "V" once. All the operators are executed once to generate the final result. That is, there is no concurrent operations. Therefore, the execution efficiency on large-scale data is low and a low utilization rate of system resources is caused.

Way (2): the operator of each layer is calculated in a strictly ordered sequence, and an output of an upper-layer operator is an input of a lower-layer operator. For example, when the above statement is executed, V(1) is executed firstly to query an entity having the number of 1, and then the operator "out" is executed to query all friend entities of the entity. After that, friend entities are filtered to select a friend entity whose age is 25. The name of the friend entity is outputted. Because the operator of each layer are executed in the strictly ordered sequence, the lower-upper operator may be executed after all execution results of the upper-layer operator are obtained. The execution of the operator of each layer may block the entire execution flow, which is also inefficient in the large-scale data.

It may be understood that, in the present disclosure, by allocating different operators to different threads, after a part but not all of the execution results of the former operator is generated, the part of execution results may be processed by the thread of the latter operator while the former operator continuously executes operations of the corresponding operator to generate other execution results. There is no need to execute the latter operator after the execution of the former operator is completed, such that the waiting time of executing adjacent operators may be reduced and an effect that the threads corresponding to a plurality of operators are operated in parallel is achieved, thereby improving the traversal efficiency of the graph database.

It should be noted that, the graph traversal statement may include at least two operators, causing a large number of created buffer queues. In order to distinguish these buffer queues, address information may be set for each buffer queue, such that each thread may accurately locate the buffer queue when executing the operation of the operator.

For example, when the thread is allocated for each operator and the buffer queue is created for each two adjacent operators in the single computer device, the address information may be a queue identifier of the buffer queue, such as a queue number or port information of an occupied port. In order to help each thread to query the address information of the buffer queue, a relationship table of the thread queue may be set in the computer device. In the relationship table of the thread queue, for a thread, the queue identifier of the buffer queue for storing the execution result of the operator executed by the thread, and the queue identifier of the buffer queue for storing the execution result of the former operator of the operator executed by the thread are included. It should be noted that there is no previous operator before a first operator. In this case, the queue identifier of the buffer queue for storing the execution result of the former operator may be set to null or a default value.

For example, when the threads are allocated to the operators and the buffer queues are created for each two adjacent operators on at least two computer devices, for the first operator, the address information of the buffer queue for saving the execution result of the first operator is sent to the computer device for executing the first operator, such that the computer device for executing the first operator locates the buffer queue based on the received address information. For a target operator other than the first operator, the address information of a first buffer queue for saving the execution result of a previous operator of the target operator and the address information of a second buffer queue for saving the execution result of the target operator are sent to the computer device for executing the target operator, such that the computer device for executing the target operator may locate the first buffer queue and second buffer queue based on the received address information of the first buffer queue and the received address information of the second buffer queue.

When the buffer queue is created in a queue cluster, the address information of the buffer queue includes the queue identifier. When the buffer queue is created in the computer device, the address information of the buffer queue includes at least one of a device identifier of the computer device where the buffer queue is located, port information and the queue identifier. For example, the address information of the buffer queue may be determined by using a lightweighted implementation of ip (internet protocol addres): port: id (identity), where ip indicates the computer identifier of the computer device, port indicates the port information of the computer device, and id indicates a global queue identifier of the buffer queue. In detail, buffer queues may be located through the device identifier "ip" and the port information "port", and the buffer queue may be determined through the queue identifier "id".

With embodiments of the present disclosure, the graph traversal statement is obtained, the at least two operators contained in the graph traversal statement and the execution order of the at least two operators are determined, the threads are allocated to each operator, and the buffer queue is created for each two adjacent operators. For each two adjacent operators, the operation of the former operator is executed by the thread corresponding to the former operator of the two adjacent operators. The execution result of the former operator is inputted to the buffer queue corresponding to the two adjacent operators. The execution result of the former operator is read from the buffer queue in parallel by the thread corresponding to the latter operator of the two adjacent operators, to execute the operation of the latter operator. With the technical solution, the buffer queue is created for each two adjacent operators, such that the execution result stored in the buffer queue may be read to execute the latter operator after the former operator generates and writes the execution result into the buffer queue. Therefore, the operators may be executed in parallel, to improve the execution efficiency of the traversal operation and the utilization rate of system resources.

Figure 2:
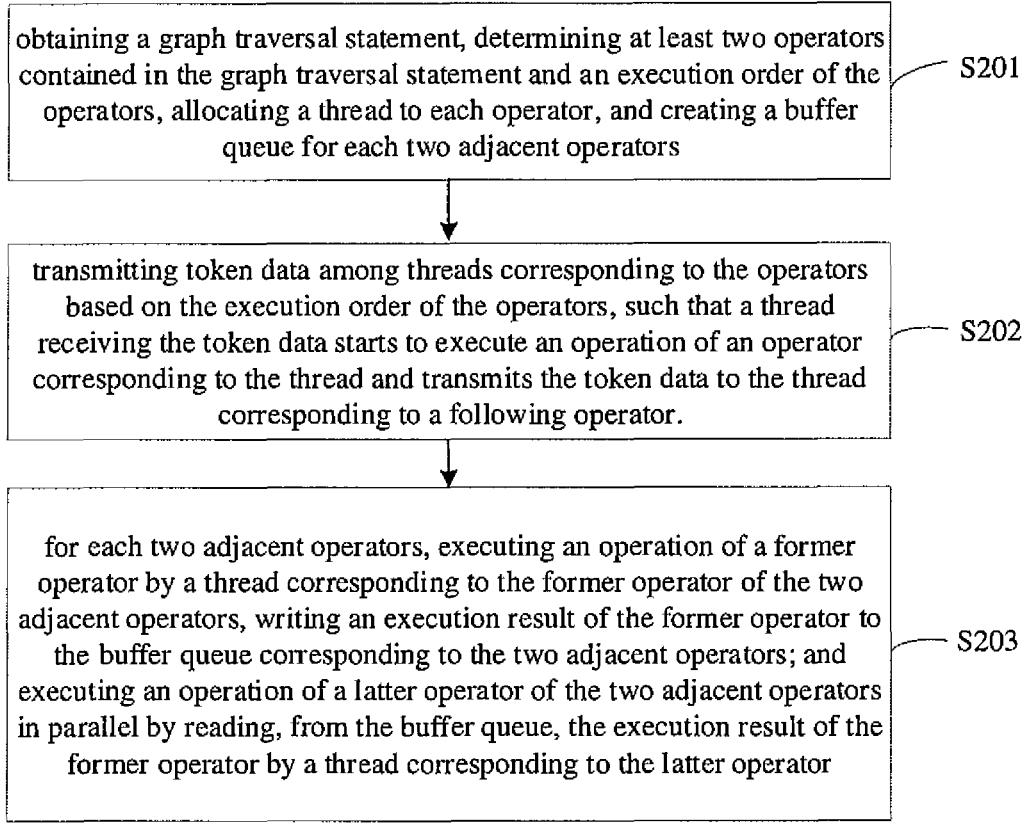
FIG. 2 is a flowchart illustrating another method for traversing a graph database according to an embodiment of the present disclosure.

FIG. 2 is another flowchart illustrating a method for traversing a graph database according to embodiments of the present disclosure. The embodiments of the present disclosure are optimized and improved on the basis of the technical solutions of the above embodiments.

Further, the method for traversing the graph database further includes transmitting token data among threads corresponding to the operators based on the execution order of the at least two operators, such that a thread receiving the token data starts to execute an operator corresponding to the thread and transmits the token data to a thread corresponding to a following operator", to associate the start of executing the following operator by the thread.

As illustrated in FIG. 2, the method for traversing the graph database includes following.

In block 201, a graph traversal statement is obtained, at least two operators contained in the graph traversal statement and an execution order of the at least two operators are determined, a thread is allocated for each operator, and a buffer queue is created for each two adjacent operators.

In block 202, token data is transmitted among threads corresponding to respective operators based on the execution order of the operators, such that a thread receiving the token data starts to execute an operator corresponding to the thread and transmits the token data to the thread corresponding to a following operator.

The token data may be composed of a character string of a set length, stored in an electronic device in advance, and transmitted among different threads before the thread corresponding to each operator executes the operator.

As an example, after a thread corresponding to a first operator receives the token data, the thread receiving the token data starts to execute the operation of the first operator corresponding to the thread and transmits the token data to a thread corresponding to a second operator, such that the thread corresponding to the second operator is triggered to execute the second operator. By analogy, after a previous thread starts to execute the operator corresponding to the previous thread, the token data is transmitted to the thread corresponding to the following operator. Therefore, each thread automatically starts to execute the operator corresponding thereto.

It may be understood that, when the number of available threads is greater than or equal to the number of operators, the operators may be allocated with different threads to execute corresponding operations of each operator. The thread corresponding to each operator is triggered in turn through the transmitted token data to execute the corresponding operation of each operator.

However, when the number of available threads is less than the number of operators, there may be an operator that has no thread corresponding thereto, limiting the number of concurrent threads. Therefore, re-allocation for threads may be implemented by reusing allocated threads.

As an example, after all threads are allocated to the operators, an execution state of each allocated thread may be monitored. After one allocated thread completes the operation of the operator allocated to that allocated thread, this allocated thread may be re-allocated to the operator that has no thread 0 thereto to be allocated until all operators are allocated with the threads.

Correspondingly, when the token data is transmitted among the threads corresponding to the at least two operators based on the execution order of the operators, the allocated thread that is reused is triggered by: determining, by the thread receiving the token data, whether the following operator has a corresponding thread; in response to determining by the thread receiving the token data that the following operator does not have the corresponding thread, reallocating an allocated thread meeting a preset condition to the following operator and transmitting the token data to the allocated thread, such that the allocated thread executes the following operator. The preset condition is that the allocated thread completes the operation of the operator corresponding to the allocated thread.

For example, there are 4 available threads and the number of operators corresponding to the graph traversal statement is 5. The thread corresponding to the first operator starts to execute a first operator corresponding to the thread and transmits token data to the thread corresponding to the second operator, such that the thread corresponding to the second operator starts to execute the second operator corresponding to the thread and transmits the token data to the thread corresponding to the following operator, and so on. When starting to execute the fourth operator, the token data is to be transmitted to the thread corresponding to the fifth operator. However, the concurrent resource is exhausted. There is a need to wait for the allocated thread to complete the operation of the corresponding operator and to release the concurrent resource. When the execution of the thread corresponding to the first operator is completed and the concurrent resource is released, the thread which is idle is allocated to the fifth operator, and the token data is transmitted to the thread corresponding to the fifth operator, such that the thread corresponding to the fifth operator starts to execute an operation of the fifth operator corresponding to this thread.

In an implementation of embodiments of the present disclosure, the token data may be implemented in the form of a global number. For example, each operator is given a serial number, and the global number is registered in the electronic device. When each operator is executed, the global number is modified to a number corresponding to a following operator, to determine the following operator and to query the thread corresponding to the following operator. After the thread corresponding to the following operator is queried, the global number is changed. When the following operator is executed, the global number is modified again, and so on, until all operators are executed.

In block 203, when each thread executes the operation of respective operators, for each two adjacent operators, an operation of a former operator is executed by a thread corresponding to the former operator of the two adjacent operators, the execution result of the former operator is written to the buffer queue corresponding to the two adjacent operators, and the execution result of the former operator of the two adjacent operators is read in parallel from the buffer queue by a thread corresponding to a latter operator of the two adjacent operators, to execute an operation of the latter operator.

With the technical solution of embodiments of the present disclosure, the token data is transmitted among the threads corresponding to respective operators based on the execution order of the operators, such that the thread receiving the token data starts to execute the operation of the operator corresponding to the thread and transmits the token data to the thread corresponding to the following operator. In this way, by transmitting the token data among the threads corresponding to the operators, the thread corresponding to the following operator is associated and triggered to execute the following operator, thereby shortening the waiting time between the threads corresponding to the adjacent operators and improving the execution efficiency.

Figure 3A:
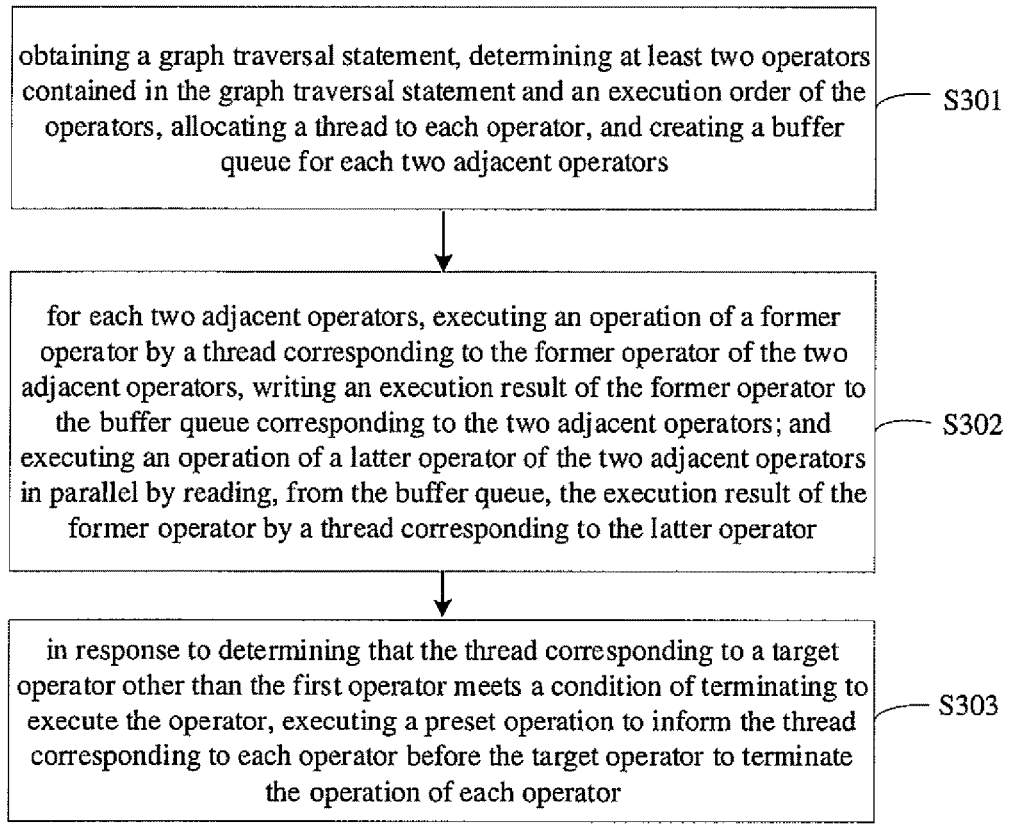
FIG. 3A is a flowchart illustrating still another method for traversing a graph database according to an embodiment of the present disclosure.

FIG. 3A is a flowchart illustrating still another method for traversing a graph database according to embodiments of the present disclosure. This embodiment of the present disclosure is optimized and improved on the basis of the technical solutions of the above embodiments.

Further, the method for traversing the graph database further includes in response to determining that the thread corresponding to a target operator other than the first operator meets a condition of terminating to execute the operator, executing a preset operation to inform the thread corresponding to each operator before the target operator to terminate the operation of each operator, to eliminate a large number of invalid calculations.

As illustrated in FIG. 3A, the method for traversing the graph database includes following.

In block 301, a graph traversal statement is obtained, at least two operators contained in the graph traversal statement and an execution order of the at least two operators are determined, a thread is allocated for each operator, and a buffer queue is created for each two adjacent operators.

In block 302, for each two adjacent operators, an operation of a former operator is executed by a thread corresponding to the former operator of the two adjacent operators, the execution result of the former operator is written to the buffer queue corresponding to the two adjacent operators, and the execution result of the former operator of the two adjacent operators is read from the buffer queue in parallel by a thread corresponding to a latter operator of the two adjacent operators, to execute an operation of the latter operator.

In block 303, in response to determining that the thread corresponding to a target operator other the first operator meets a condition of terminating to execute the operator, a preset operation is executed to inform the thread corresponding to each operator before the target operator to terminate the operation of each operator.

It may be understood that, when the thread corresponding to the target operator other than the first operator meets the condition of terminating to execute the operator, the thread corresponding to each operator before the target operator is notified to terminate the operation of each operator by executing the preset operation. The thread corresponding to each operator after the target operator continuously executes the operation of each operator to obtain a final execution result. Exemplarily, the condition of terminating to execute the operator may include all required data being obtained. With the above technical solution, termination information is generated by executing the preset operation, and the termination information is transmitted along a direction opposite to a data flow in a chain of the buffer queues, thereby implementing to turn off the threads layer by layer.

In an implementation of embodiments of the present disclosure, executing the preset operation to inform the thread corresponding to each operator before the target operator to terminate the corresponding operator may include: taking any target operator as a current operator; switching a reading end state of the buffer queue for saving the execution result of a previous operator of the current operator to a closed state, such that the thread corresponding to the previous operator stops writing data to the buffer queue and switches a writing end state of the buffer queue to the closed state when detecting that the reading end state of the buffer queue is switched to the closed state, to terminate the execution of the previous operator; taking the previous operator as a new current operator, and executing the operation for switching the reading end state of the buffer queue for saving execution result data of a previous operator of the new current operator until an execution of the first operator is terminated.

In detail, for the target operator, when the thread corresponding to the target operator other than the first operator meets the condition of terminating to execute the operator, the target operator is taken as the current operator, and the reading end state of the buffer queue for saving the execution result of the previous operator of the current operator is switched to the closed state, such that the thread for executing the current operator may not continuously read the execution result of the previous operator from the buffer queue. Accordingly, when the thread corresponding to the previous operator detects that the reading end state of the buffer queue for saving the execution result of the previous operator is in the closed state, the following operator does not need to obtain the execution result of the operation of the operator corresponding to the thread. Therefore, the thread actively stops writing data to the buffer queue, that is, stops executing the operator corresponding to the thread and prevents the generation of the execution result. Meanwhile, the writing end state of the buffer queue is switched to the closed state, and writing data to the buffer queue is passively stopped. The previous operator is taken as a new current operator and the operation for switching the reading end state of the buffer queue for storing the execution result of the previous operator of the current operator to the closed state is circularly executed until the execution for the first operator is terminated.

Figure 3B:
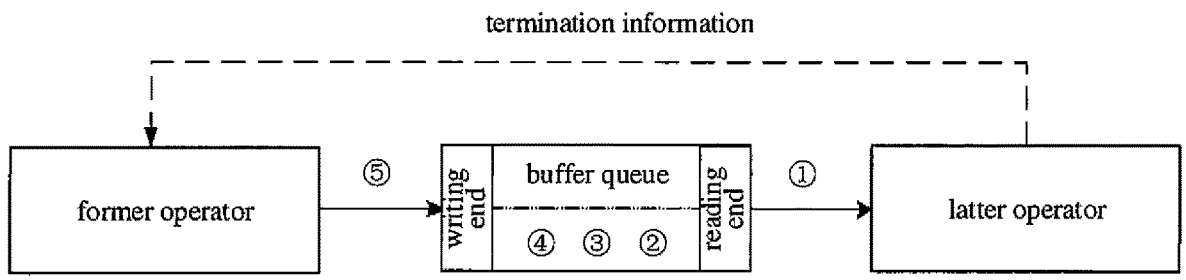
FIG. 3B is a schematic diagram illustrating transmitting termination information between two adjacent operators according to an embodiment of the present disclosure.

As illustrated in FIG. 3B, a schematic diagram illustrating transmitting termination information between two adjacent operators is provided. When the latter operator obtains the execution result ① from the buffer queue, it is determined that the condition of terminating to execute the operator is met. At this time, the reading end state of the buffer queue is switched to the closed state, and the following operator is prohibited from reading the execution result ②, ③ and ④ from the buffer queue. When the former operator detects that the reading end state of the buffer queue is switched to the closed state, the former operator stops writing the execution result ⑤ of the former operator into the buffer queue, the writing end state of the buffer queue is switched to the closed state, and the thread corresponding to the former operator is prohibited from writing data into the buffer queue. Therefore, the execution of the former operator is terminated and reverse transmission of the termination information is implemented. The former operator is taken as a new latter operator, the reading end state of the buffer queue corresponding to a former operator of the new latter operator is switched to the closed state continuously, and so on, until the execution for the first operator is terminated.

In another implementation of embodiments of the present disclosure, executing the preset operation to inform the thread corresponding to each operator before the target operator to terminate the operation of the operator may include: adding termination information on a preset global information table, such that the thread corresponding to each operator before the target operator terminates the operation of each operator in response to reading the termination information.

In detail, a global information table may be set in advance, and each operator may add or read information to or from the global information table. When it is determined that the thread corresponding to any operator other than the first operator meets the condition of terminating to execute the operator, the termination information is added to the preset global information table. Since all the threads for executing respective operators included in the graph traversal statement may read the termination information from the global information table, the thread corresponding to each operator before the target operator may terminate the operation for executing the corresponding operator when the termination information is added to the global information table, and thus no new execution result is generated as the input of the target operator.

It may be understood that, since the operators before the target operator may read the termination information and terminate the generation of the execution result at the same time in the above way, there is no time delay when the adjacent operators are terminated, and thus the generation of invalid calculation may be further reduced. In addition, other global information may be added to the global information table for sharing information among threads corresponding to the operators included in the graph traversal statement.

With embodiments of the present disclosure, in response to determining that the thread corresponding to the target operator other than the first operator meets the condition of terminating to execute the operator, the preset operation is executed to inform the thread corresponding to each operator before the target operator to terminate the operation of the operator. With the above technical solution, when the following operator determines that the condition of terminating to execute the operator is met, the preset operation is executed to inform all its previous operators to terminate the execution, thereby eliminating a large number of potentially invalid calculations by a feedback mechanism.

Figure 4:
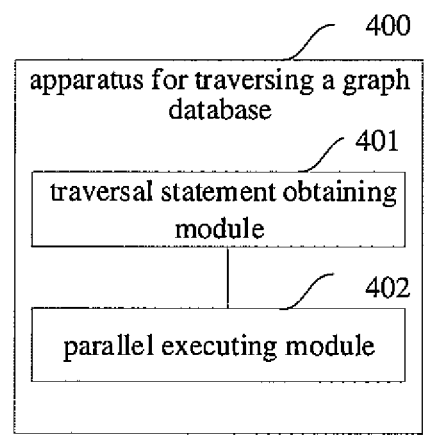
FIG. 4 is a block diagram illustrating an apparatus for traversing a graph database according to an embodiment of the present disclosure.

FIG. 4 is a block diagram illustrating an apparatus for traversing a graph database according to embodiments of the present disclosure. The embodiment of the present disclosure is applicable to a condition where data traversal is performed in the graph database. The apparatus is implemented by software and/or hardware, and is specifically configured in an electronic device with a certain data operation capability.

The apparatus 400 for traversing the graph database illustrated in FIG. 4 includes: a traversal statement obtaining module 401 and an parallel executing module 402.

The traversal statement obtaining module 401 is configured to obtain a graph traversal statement, to determine at least two operators contained in the graph traversal statement and an execution order of the at least two operators, to allocate a thread to each operator, and to create a buffer queue for each two adjacent operators.

The parallel executing module 402 is configured to: for each two adjacent operators, execute an operation of a former operator by a thread corresponding to the former operator of the two adjacent operators, write an execution result of the former operator to the buffer queue corresponding to the two adjacent operators; and read, from the buffer queue, the execution result of the former operator in the two adjacent operators in parallel by a thread corresponding to a latter operator of the two adjacent operators, to execute an operation of the latter operator.

With embodiments of the present disclosure, via the traversal statement obtaining module, the graph traversal statement is obtained, the at least two operators contained in the graph traversal statement and the execution order of the at least two operators are determined, the thread is allocated to each operator, and the buffer queue is created for each two adjacent operators. Via the parallel executing module, for each two adjacent operators, the operation of the former operator is executed by the thread corresponding to the former operator, the execution result of the former operator is inputted to the buffer queue corresponding to the two adjacent operators, and the execution result of the former operator is read from the buffer queue in parallel by the thread corresponding to the latter operator of the two adjacent operators, to execute the operation of the latter operator. With the technical solution, the buffer queue is created between each two adjacent operators, such that the execution result in the buffer queue may be read to execute the latter operator after the former operator generates and writes the execution result into the buffer queue, thereby implementing to execute the operators in parallel, improving the execution efficiency of the traversal operation and the utilization rate of the system resources.

Further, the apparatus also includes: a token transmitting module.

The token transmitting module is configured to transmit token data among threads corresponding to the at least two operators based on the execution order of the at least two operators, such that a thread receiving the token data starts to execute an operation of an operator corresponding to the thread and transmits the token data to the thread corresponding to a following operator.

Further, the traversal statement obtaining module 401 is configured to allocate the thread to each operator by according to the number of available threads, allocating the thread to each operator based on the execution order of the at least two operators.

Further, in a case that the number of available threads is less than the number of operators, the traversal statement obtaining module 401 is configured to transmit the token data among the threads corresponding to the at least two operators based on the execution order of the at least two operators by the following.

The thread receiving the token data determines whether a corresponding thread is allocated to the following operator.

In a case that the thread receiving the token data determines that no corresponding thread is allocated to the following operator, and an allocated thread meets a preset condition, the allocated thread is allocated to the following operator, and the token data is transmitted to the allocated thread, such that the allocated thread executes the operation of the following operator.

The preset condition is that the allocated thread completes the operation of the operator corresponding to the allocated thread.

Further, the traversal statement obtaining module 401 is configured to allocate the thread to each operator and create the buffer queue for each two adjacent operators by the following.

A thread of a local computer device is allocated to each operator, and a buffer queue is created for each two adjacent operators in the local computer device. In another implementation, for each operator, a computer device for executing the operator is determined from at least two computer devices, and a thread of the determined computer device is allocated to the operator. For each two adjacent operators, a computer device for creating the buffer queue is determined from at least two computer devices, and the buffer queue corresponding to the two adjacent operators is created in the determined computer device.

Further, the apparatus also includes an address information saving module.

The address information saving module is configured to: for a first operator, send address information of a buffer queue for saving the execution result of the first operator to a computer device for executing the first operator, such that the computer device for executing the first operator locates the buffer queue based on the address information; and for a target operator other than the first operator, send address information of a first buffer queue for saving the execution result of a previous operator of the target operator and address information of a second buffer queue for saving the execution result of the target operator to a computer device for executing the target operator, such that the computer device for executing the target operator locates the first buffer queue and the second buffer queue based on the address information of the first buffer queue and the address information of the second buffer queue.

Further, the buffer queue is created in a queue cluster, the address information of the buffer queue includes a queue identifier. In a case that the buffer queue is created in the computer device, the address information of the buffer queue includes at least one of a device identifier of the computer device where the buffer queue is located, port information of the computer device where the buffer queue is located and the queue identifier.

Further, the apparatus also includes a thread terminating module.

The thread terminating module is configured to, in response to determining that the thread corresponding to a target operator other than the first operator meets a condition for terminating to execute the operator, execute a preset operation to inform the thread corresponding to each operator before the target operator to terminate the operation of each operator.

Further, the thread terminating module is configured to execute the preset operation to inform the thread corresponding to each operator before the target operator to terminate the operation of each operator by the following.

The target operator is taken as a current operator; a reading end state of the buffer queue for saving the execution result of a previous operator of the current operator is switched to a closed state, such that the thread corresponding to the previous operator stops writing data to the buffer queue and switches a writing end state of the buffer queue to the closed state when detecting that the reading end state of the buffer queue is in the closed state, to terminate an execution of the previous operator. The previous operator is taken as a new current operator, and the operation for switching the reading end state of the buffer queue for saving the execution result of a previous operator of the new current operator to the closed state until an execution of the first operator is terminated. In an implementation, termination information is added to a preset global information table, such that the thread corresponding to each operator before the target operator terminates the operation of each operator when reading the termination information.

The apparatus for traversing the graph database described above may execute the method for traversing the graph database according to any one of embodiments of the present disclosure, and has the corresponding functional modules and beneficial effects for executing the method for traversing the graph database.

According to embodiments of the present disclosure, the present disclosure also provides an electronic device and a readable storage medium.

Figure 5:
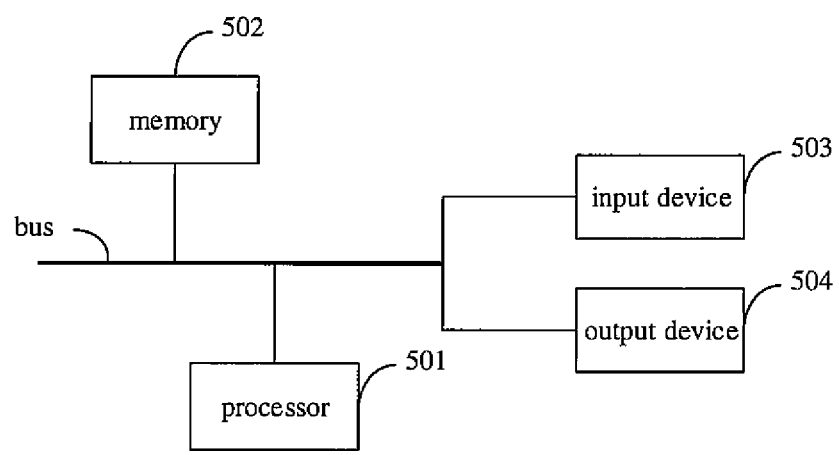
FIG. 5 is a block diagram illustrating an electronic device capable of implementing a method for traversing a graph database according to embodiments of the present disclosure.

As illustrated in FIG. 5, a block diagram illustrating an electronic device capable of implementing a method for traversing a graph database according to embodiments of the present disclosure is provided. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the present disclosure described and/or claimed herein.

As illustrated in FIG. 5, the electronic device includes: one or more processors 501, a memory 502, and interfaces for connecting various components, including a high-speed interface and a low-speed interface. Various components are connected to each other by different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides a part of necessary operations (for example, as a server array, a group of blade servers, or a multiprocessor system). In FIG. 5, a processor 501 is taken as an example.

The memory 502 is a non-transitory computer readable storage medium provided by the present disclosure. The memory is configured to store instructions executed by at least one processor, to enable the at least one processor to execute a method for traversing a graph database according to the present disclosure. The non-transitory computer readable storage medium according to the present disclosure is configured to store computer instructions. The computer instructions are configured to enable a computer to execute the method for traversing the graph database according to the present disclosure.

As the non-transitory computer readable storage medium, the memory 502 may be configured to store non-transitory software programs, non-transitory computer executable programs and modules, such as program instructions/modules (such as, an apparatus 400 for traversing a graph database illustrated in FIG. 4 includes the traversal statement obtaining module 401 and the parallel executing module 402) corresponding to the method for traversing the graph database according to embodiments of the present disclosure. The processor 501 is configured to execute various functional applications and data processing of the server by operating non-transitory software programs, instructions and modules stored in the memory 502, that is, implements the method for traversing the graph database according to the above method embodiments.

The memory 502 may include a storage program region and a storage data region. The storage program region may store an application required by an operating system and at least one function. The storage data region may store data created according to usage of the electronic device for executing the method for traversing the graph database. In addition, the memory 502 may include a high-speed random access memory and a non-transitory memory, such as at least one disk memory device, a flash memory device, or other non-transitory solid-state memory device. In some embodiments, the memory 502 may alternatively include memories remotely located to the processor 501, and these remote memories may be connected to the electronic device for executing the method for traversing the graph database through a network. Examples of the above network include, but are not limited to, an Internet, an intranet, a local area network, a mobile communication network and combinations thereof.

The electronic device capable of implementing the method for traversing the graph database may also include: an input device 503 and an output device 504. The processor 501, the memory 502, the input device 503, and the output device 504 may be connected through a bus or in other means. In FIG. 5, the bus is taken as an example.

The input device 503 may receive inputted digital or character information, and generate key signal input related to user setting and function control of the electronic device for executing the method for traversing the graph database, such as a touch screen, a keypad, a mouse, a track pad, a touch pad, an indicator stick, one or more mouse buttons, a trackball, a joystick and other input device. The output device 504 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal configured to provide the machine instructions and/or data to the programmable processor.

To provide interaction with the user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and technologies described herein), or a computing system including any combination of the background component, the middleware component, and the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact through the communication network. A relationship between the client and the server is generated by computer programs operated on a corresponding computer and having a client-server relationship with each other.

With embodiments of the present disclosure, the graph traversal statement is obtained, the at least two operators contained in the graph traversal statement and the execution order of at least two operators are determined, the thread is allocated to each operator, and the buffer queue is created for each two adjacent operators. For each two adjacent operators, the operation of the former operator is executed by the thread corresponding to the former operator of the two adjacent operators, the execution result of the former operator is inputted to the buffer queue corresponding to the two adjacent operators, and the execution result of the former operator in the two adjacent operators is read from the buffer queue in parallel by the thread corresponding to the latter operator of the two adjacent operators, to execute the operation of the latter operator. With the technical solution, the buffer queue is created between each two adjacent operators, such that the execution result in the buffer queue may be read to execute the latter operator after the former operator in the two adjacent operators generates the execution result and writes the execution result into the buffer queue, thereby implementing to execute the operators in parallel, and improving the execution efficiency of the traversal operation and the utilization rate of the system resources.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for traversing a graph database, comprising:
   obtaining, by a computer device, a graph traversal statement;
   determining, by the computer device, at least two operators contained in the graph traversal statement and an execution order of the at least two operators;
   allocating, by the computer device, respective available threads of the computer device to the at least two operators based on the execution order of the at least two operators;
   creating, by the computer device, a buffer queue of the computer device for each two adjacent operators;
   for each two adjacent operators,
   executing an operation of a former operator by a first available thread of the computer device corresponding to the former operator of the two adjacent operators, in response to receiving, by the first available thread, token data that is transmitted among the respective available threads;
   writing, by the first available thread, an execution result of the former operator to the buffer queue and transmitting, by the first available thread, the token data to a second available thread of the computer device corresponding to a latter operator of the two adjacent operators; and
   after receiving, by the second available thread, the token data, upon the execution result is available, executing an operation of the latter operator by reading, from the buffer queue, the execution result of the former operator by the second available thread;
   wherein while executing, by the second available thread, the operation of the latter operator based on the execution result of the former operator, the operation of the former operator is executed by the first available thread and an additional execution result of the former operator is written by the first available thread to the buffer queue;
   wherein the method further comprises:
   in response to determining that a number of available threads is less than a number of operators, determining, by the first available thread that has received the token data, whether the second available thread is allocated to the latter operator;
   in response to determining, by the first available thread that has received the token data, that the second available thread is not allocated to the latter operator and an allocated thread meets a preset condition, allocating the allocated thread to the latter operator, and transmitting the token data to the allocated thread to trigger the allocated thread to execute the operation of the latter operator;
   wherein the preset condition is that the allocated thread has completed the operation of an operator corresponding to the allocated thread.

2. The method of claim 1, wherein allocating respective available threads to the at least two operators and creating the buffer queue of the computer device for each two adjacent operators comprises:
   allocating respective available threads of a local computer device to the at least two operators, and creating the buffer queue for each two adjacent operators in the local computer device; or
   for each operator, determining a respective computer device for executing the operator from at least two computer devices, and allocating an available thread of the determined computer device to the operator; and
   for each two adjacent operators, determining a respective computer device for creating the buffer queue from at least two computer devices, and creating the buffer queue corresponding to the two adjacent operators in the determined computer device.

3. The method of claim 2, wherein the method further comprises:
   for a first operator, sending address information of a buffer queue for saving the execution result of the first operator to the computer device for executing the first operator, such that the computer device for executing the first operator locates the buffer queue based on the address information; and
   for a target operator other than the first operator, sending address information of a first buffer queue for saving the execution result of a previous operator of the target operator and address information of a second buffer queue for saving the execution result of the target operator to the computer device for executing the target operator, such that the computer device for executing the target operator locates the first buffer queue and the second buffer queue based on the address information of the first buffer queue and the address information of the second buffer queue.

4. The method of claim 3, wherein, in a case that the buffer queue is created in a queue cluster, the address information of the buffer queue comprises a queue identifier; and
   in a case that the buffer queue is created in the computer device, the address information of the buffer queue comprises at least one of a device identifier of the computer device where the buffer queue is located, port information of the computer device where the buffer queue is located and the queue identifier.

5. The method of claim 1, wherein the method further comprises:

in response to determining that an available thread corresponding to a target operator other than a first one of the at least two operators meets a condition of terminating to execute the target operator, executing a preset operation to inform respective threads corresponding to operators before the target operator to terminate operations of the operators.

6. The method of claim 5, wherein executing the preset operation to inform the respective threads corresponding to the operators before the target operator to terminate the operations of the operators comprises:

for the target operator; switching a reading end state of the buffer queue for saving the execution result of a previous operator of the target operator to a closed state, such that the available thread corresponding to the previous operator stops writing data to the buffer queue and switches a writing end state of the buffer queue to the closed state in response to detecting that the reading end state of the buffer queue is in the closed state, to terminate the execution of the previous operator; for the previous operator of the target operator, switching the reading end state of the buffer queue for saving the execution result of a previous operator of the pervious operator to the closed state; repeating switching the reading end state to the closed state until an execution of the first operator is terminated; or adding termination information to a preset global information table, such that the available thread corresponding to each operator before the target operator terminates the operation of each operator in response to reading the termination information.

7. An electronic device, comprising:
at least one processor; and
a memory, communicatively coupled to the at least one processor,
wherein the memory is configured to store instructions executed by the at least one processor, and the at least one processor is caused to:
obtain a graph traversal statement;
determine at least two operators contained in the graph traversal statement and an execution order of the at least two operators;
allocate respective available threads of the electronic device to the at least two operators based on the execution order of the at least two operators;
create a buffer queue of the electronic device for each two adjacent operators; and
for each two adjacent operators,
execute an operation of a former operator by a first available thread of the electronic device corresponding to the former operator of the two adjacent operators, in response to receiving, by the first available thread, token data that is transmitted among the respective available threads;
write an execution result of the former operator to the buffer queue and transmitting, by the first available thread, the token data to a second available thread of the electronic device corresponding to a latter operator of the two adjacent operators; and
after receiving, by the second available thread, the token data, upon the execution result is available, execute an operation of the latter operator by reading, from the buffer queue, the execution result of the former operator by the second available thread,
wherein while executing, by the second available thread, the operation of the latter operator based on the execution result of the former operator, the operation of the former operator is executed by the first available thread and an additional execution result of the former operator is written by the first available thread to the buffer queue;

wherein the at least one processor is further caused to:
in response to determining that a number of available threads is less than a number of operators, determine, by the first available thread that has received the token data, whether the second available thread is allocated to the latter operator;
in response to determining, by the first available thread that has received the token data, that the second available thread is not allocated to the latter operator and an allocated thread meets a preset condition, allocate the allocated thread to the latter operator, and transmit the token data to the allocated thread to trigger the allocated thread to execute the operation of the latter operator;
wherein the preset condition is that the allocated thread has completed the operation of an operator corresponding to the allocated thread.

8. The electronic device of claim 7, wherein the at least one processor is configured to:
allocate respective available threads of a local computer device to the at least two operators, and creating the buffer queue for each two adjacent operators in the local computer device; or
for each operator, determining a respective computer device for executing the operator from at least two computer devices, and allocating an available thread of the determined computer device to the operator; and
for each two adjacent operators, determining a respective computer device for creating the buffer queue from at least two computer devices, and creating the buffer queue corresponding to the two adjacent operators in the determined computer device.

9. The electronic device of claim 8, wherein the at least one processor is configured to:
for a first operator, send address information of a buffer queue for saving the execution result of the first operator to the computer device for executing the first operator, such that the computer device for executing the first operator locates the buffer queue based on the address information; and
for a target operator other than the first operator, send address information of a first buffer queue for saving the execution result of a previous operator of the target operator and address information of a second buffer queue for saving the execution result of the target operator to the computer device for executing the target operator, such that the computer device for executing the target operator locates the first buffer queue and the second buffer queue based on the address information of the first buffer queue and the address information of the second buffer queue.

10. The electronic device of claim 9, wherein, in a case that the buffer queue is created in a queue cluster, the address information of the buffer queue comprises a queue identifier; and
in a case that the buffer queue is created in the computer device, the address information of the buffer queue comprises at least one of a device identifier of the computer device where the buffer queue is located, port information of the computer device where the buffer queue is located and the queue identifier.

11. The electronic device of claim 7, wherein the at least one processor is further configured to:

in response to determining that an available thread corresponding to a target operator other than a first one of the at least two operators meets a condition of terminating to execute the target operator, execute a preset operation to inform respective threads corresponding to operators before the target operator to terminate operations of the operators.

12. The electronic device of claim 11, wherein the at least one processor is configured to execute the preset operation to inform the respective threads corresponding to the operators before the target operator to terminate the operations of the operators by:
for the target operator; switching a reading end state of the buffer queue for saving the execution result of a previous operator of the target operator to a closed state, such that the available thread corresponding to the previous operator stops writing data to the buffer queue and switches a writing end state of the buffer queue to the closed state in response to detecting that the reading end state of the buffer queue is in the closed state, to terminate the execution of the previous operator; for the previous operator of the target operator, switching the reading end state of the buffer queue for saving the execution result of a previous operator of the pervious operator to the closed state; repeating switching the reading end state to the closed state until an execution of the first operator is terminated; or
adding termination information to a preset global information table, such that the available thread corresponding to each operator before the target operator terminates the operation of each operator in response to reading the termination information.

13. A non-transitory computer readable storage medium, having computer instructions stored thereon, wherein the computer instructions are configured to cause a computer to execute a method for traversing a graph database, the method comprising:
obtaining a graph traversal statement;
determining at least two operators contained in the graph traversal statement and an execution order of the at least two operators;
allocating respective available threads of the computer to the at least two operators based on the execution order of the at least two operators;
creating a buffer queue of the computer for each two adjacent operators; and
for each two adjacent operators,
executing an operation of a former operator by a first available thread of the computer corresponding to the former operator in the two adjacent operators, in response to receiving, by the first available thread, token data that is transmitted among the respective available threads,
writing, by the first available thread, an execution result of the former operator to the buffer queue and transmitting, by the first available thread, the token data to a second available thread of the computer corresponding to a latter operator of the two adjacent operators; and
after receiving, by the second available thread, the token data, upon the execution result is available, executing an operation of the latter operator by reading, from the buffer queue, the execution result of the former operator by the second available thread;
wherein while executing, by the second available thread, the operation of the latter operator based on the execution result of the former operator, the operation of the former operator is executed by the first available thread and an additional execution result of the former operator is written by the first available thread to the buffer queue;
wherein the method further comprises:
in response to determining that a number of available threads is less than a number of operators, determining, by the first available thread that has received the token data, whether the second available thread is allocated to the latter operator;
in response to determining, by the first available thread that has received the token data, that the second available thread is not allocated to the latter operator and an allocated thread meets a preset condition, allocating the allocated thread to the latter operator, and transmitting the token data to the allocated thread to trigger the allocated thread to execute the operation of the latter operator;
wherein the preset condition is that the allocated thread has completed the operation of an operator corresponding to the allocated thread.

* * * * *